United States Patent [19]

Ito et al.

[11] 4,242,704
[45] Dec. 30, 1980

[54] NOISE REDUCTION SYSTEM FOR COLOR TELEVISION SIGNAL

[75] Inventors: Yutaka Ito; Kazuo Yajima; Yoshiteru Iwanaga; Hiroshi Takahashi; Masao Inaba, all of Tokyo, Japan

[73] Assignees: Tokyo Broadcasting System Inc.; Nippon Electric Co., Ltd., both of Tokyo, Japan

[21] Appl. No.: 18,474

[22] Filed: Mar. 8, 1979

[30] Foreign Application Priority Data

Mar. 8, 1978 [JP] Japan ................................ 53-26857
Mar. 8, 1978 [JP] Japan ................................ 53-26858

[51] Int. Cl.³ ...................... H04N 5/21; H04N 9/535
[52] U.S. Cl. ........................................ 358/167; 358/36
[58] Field of Search ................................ 358/36, 167

[56] References Cited

U.S. PATENT DOCUMENTS 4,064,530  12/1977  Kaiser et al. ............................ 358/36

Primary Examiner—John C. Martin
Attorney, Agent, or Firm—Hopgood, Calimafde, Kalil, Blaustein & Lieberman

[57] ABSTRACT

A noise reduction system for improving the signal-to-noise ratio of a color television signal wherein a first television frame portion is recursively added to an immediately subsequent second television frame portion and the addition apparatus is controlled in response to the signal level difference between said first and second frame portions.

6 Claims, 22 Drawing Figures

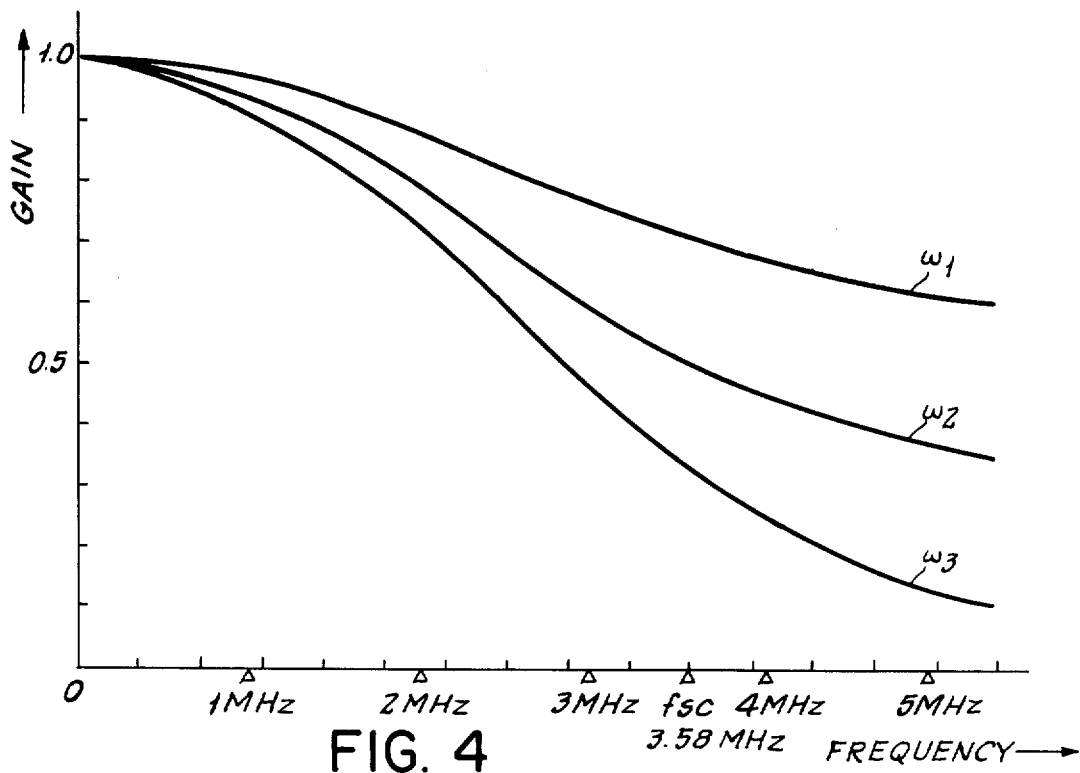
FIG. 4
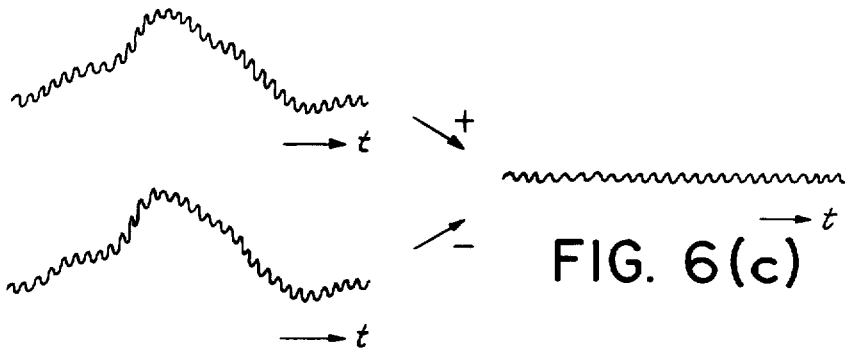
FIG. 6(a)
FIG. 6(b)
FIG. 6(c)
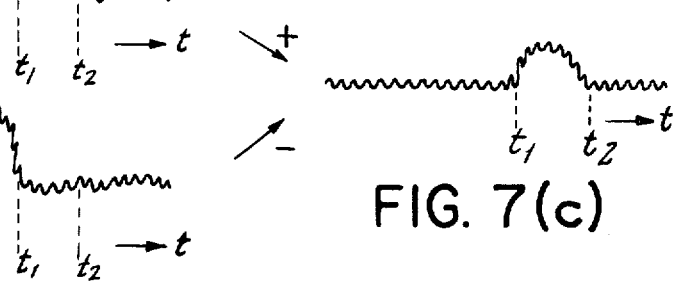
FIG. 7(a)
FIG. 7(b)
FIG. 7(c)

NOISE REDUCTION SYSTEM FOR COLOR TELEVISION SIGNAL

FIELD OF THE INVENTION

This invention relates to a noise reduction system for improving the signal-to-noise ratio (S/N) or a color television video signal and, more particularly, to a system for improving the S/N ratio of a color television video signal by utilizing the inter-frame correlation of such a signal.

BACKGROUND OF THE INVENTION

A prior art noise reduction system is disclosed, for example, in U.S. Pat. No. 4,064,530. In the disclosed system, in order to improve the S/N ratio, one to several frame portions of a video signal are recursively added to the present frame so long as there is a high inter-frame correlation as, for example, in the case of a still object being shown. When the inter-frame correlation is relatively low, as, for example, in the case of a fast moving object being shown, either no addition is performed or fewer frame portions are recursively added to the present frame. This is done in order to prevent the formation of an afterimage or lag that unavoidably accompanies recursive frame-to-frame addition for noise reduction.

It is known that the degree of viewer offense to noise in a displayed television picture depends on the level of the input video signal. If the object shown is sufficiently bright so as to make the level of the incoming video signal sufficiently high, noise is not recognized. Noise reduction therefore provides a very limited effect under such situations, as is reported in a paper titled "PERCEPTION OF RANDOM MONOCHROME VIDEO INTERFERENCE" NHK Gijutsu Kenkyu (NHK Technical Journal - in Japanese), September 1958 Vol. 10, No. 5, page 18 to page 24. Considerating this factual data with reference to a high-level input video signal, it can be seen that noise reduction is achieved with minimum effort.

On the other hand, experimental data collected by the inventors of the present invention, indicate that a high-level input video signal, when subjected to the same degree of noise reduction as that for a low-level signal, makes the reproduced picture of a human face appear keloidal.

It is also known that most noise components are in the higher frequency region of a television video signal and that they cause interference in the chrominance component of video signals. If the level of the chrominance component is high, such noise can cause blurring and smear along the profile of objects on the reproduced display. According to a conventional noise reduction system, if the effect of noise reduction is sufficiently enhanced to remove such unwanted noise, signal components in the lower frequency region are equally subjected to the increased noise reduction effect, producing a more pronounced lag or afterimage.

Therefore, to eliminate the defects in a conventional noise reducing technique, the noise reduction effect must be controlled in response not only to the degree of interframe correlation but also to the level of noise contained in the input video signal. This is required as signal processing for noise reduction, applied to a high-level video signal, results only in adverse effects rather than any appreciable improvement in the S/N ratio.

It is therefore one object of this invention to provide a noise reduction system which is capable of controlling the effects of noise reduction in response to the level of an input video signal to thereby eliminate the visually adverse effect encountered with conventional techniques.

Another object of this invention is to provide a noise reduction system which is capable of improving the S/N ratio for the high frequency region of a video signal.

Still another object of this invention is to provide a lag-free noise reduction system, which minimizes the possibilities of interference with the chrominance component, by emphasizing the noise reduction effects for high frequency regions of the video signal, with the frequency characteristics of the noise contained in the video signal being considered.

A further object of this invention is to provide a noise reduction system capable of controlling the degree of the noise reduction effect depending on the level of noise contained in the input video signal.

SUMMARY OF THE INVENTION

According to one feature of this invention, there is provided a noise reduction system for a color television video signal comprising a memory for storing a first one frame portion of said video signal; means for adding said first one frame portion to a second one frame portion immediately following said first one frame portion; and a chrominance inverter: said adding means being controlled in response to the signal level difference between said first and second frames by an input level dependent equalizer having a reference signal controlled in response to said signal level difference.

According to another feature of this invention, there is provided a noise reduction system having a frequency dependent equalizer (chroma noise equalizer) for providing a uniform distribution of noise level according to the frequency of the signal representative of the frame-to-frame signal level difference, the output of said equalizer determining the degree of said recursive addition of the first frame portion to the second frame portion.

According to still another feature of this invention, there is provided a reduction system, including a noise level detector for controlling, in response to the noise level, the reference signal for comparison with the frame-to-frame level difference signal in order to determine the recursive addition of the first frame portion to the second frame portion.

Other objects, features, construction and operation of this invention will be best understood from the following detailed description taken in conjunction with the accompanying drawings.

BRIEF DESCRIPTION OF THE DRAWINGS

FIG. 4 shows characteristic curves of a chroma noise equalizer included in the embodiment shown in FIG. 1;

FIGS. 6a–c are waveform diagrams showing a video signal having a high frame-to-frame or line-to-line correlation and an associated differential signal;

FIGS. 7a–c are graphs showing a video signal having a low frame-to-frame or line-to-line and an associated differential signal;

DESCRIPTION OF THE PREFERRED EMBODIMENT OF THE INVENTION

Figure 1:
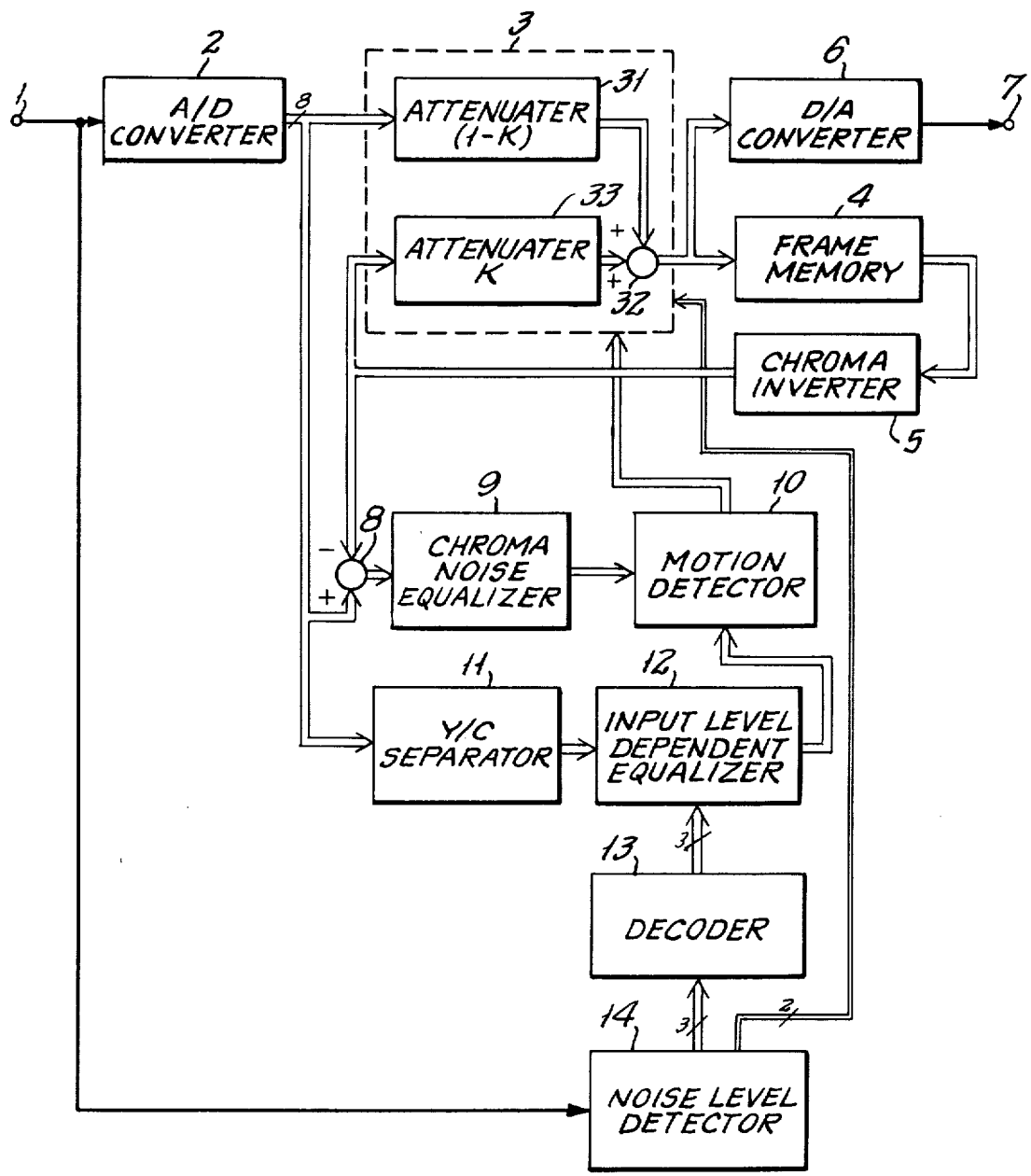
FIG. 1 is a block diagram of one embodiment of this invention.

Referring to FIG. 1, a video signal from an input terminal 1 is converted, at an analog to digital (A/D) converter 2, to an 8-bit PCM signal which is then supplied to a variable adder or summer circuit 3. There the signal from the A/D converter 2 is multiplied by the factor (1-k) at variable attenuator 31. The output from the attenuator 31 is summed at an adder 32 with the output from another variable attenuator 33 and then supplied to a frame memory 4. Memory 4 has a storage capacity of one frame portion of the video signal. The output from frame memory 4 is passed through a chroma inverter 5 and from there to variable attenuator 33 which multiplies the input by the factor k and supplies the output to adder 32. The output from adder 32 is converted, at a digital to analog (D/A) converter 6, to an analog video signal which is then supplied to output terminal 7. A subtractor 8 produces a signal representative of the frame-to-frame difference at the output level of the A/D converter 2, i.e., inter-frame difference signal. The inter-frame difference signal is passed through a chroma noise equalizer 9 (to be described hereinafter) and from there to motion detector 10. The motion detector 10 compares the difference in output between A/D converter 2, and chroma inverter 5, with a predetermined reference signal. The result of the comparison controls the factors k (1-k) for the variable attenuators 31 and 33 in the variable adder circuit 3.

The principle and operation of a noise reduction system comprised of variable attenuators 31 and 33, adder 32, frame memory 4, chroma inverter 5, subtractor 8 and motion detector 10 will not be further described herein because such a system is described in detail in U.S. Pat. No. 4,064,530.

Figure 2:
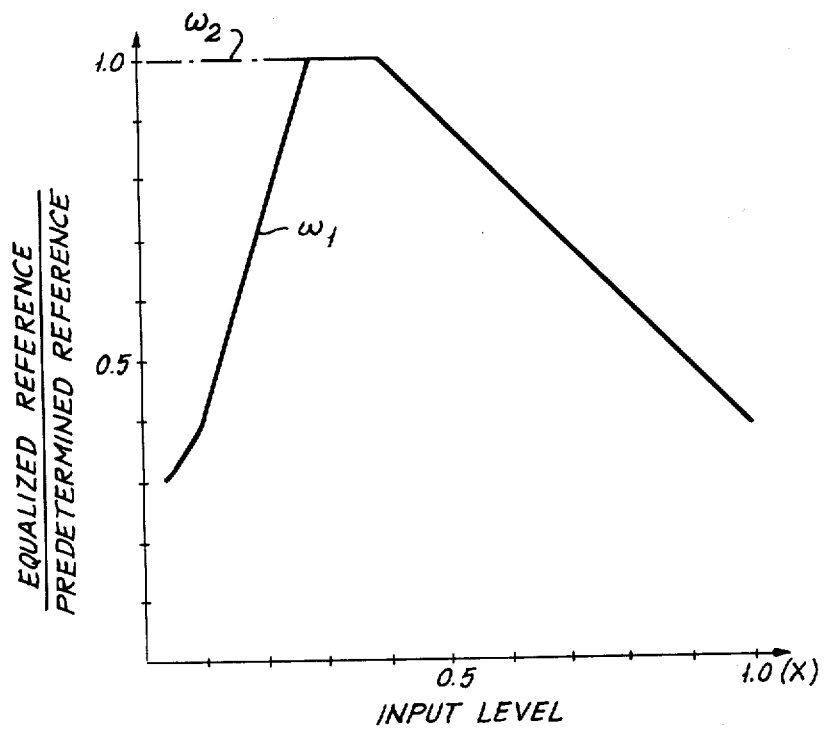
FIG. 2 shows characteristic curves of the embodiment illustrated in FIG. 1.

As described hereinabove, experimental data clearly shows that the effect of noise reduction depends on the input video signal. Based on this fact the instant invention controls the degree of noise reduction in response to the level of the input video signal. To this end, as shown in FIG. 1, the output from A/D converter 2 has the luminance component separated from the chrominance component in a luminance/chrominance (Y/C) separator 11 and is supplied to an input level dependent equalizer 12 as information representative of the input video signal level. The equalizer 12 is comprised of a read-only memory (ROM), which stores an equalized reference determined by the level of the input video signal, supplied from the Y/C separator 11, and the predetermined reference supplied from a decoder 13 (to be described hereinafter). FIG. 2 shows the characteristics of the data stored in the ROM.

Referring to FIG. 2, the x-axis represents the level of an input video signal whereas the y-axis represents the equalized reference divided by the predetermined reference. Further, referring to FIG. 2, the curve $\omega_1$ represents equalization with high precision whereas the curve $\omega_2$ represents practical equalization. According to the characteristics shown in FIG. 2, the reference level is reduced as the level of the input video signal increases, thus providing minimum noise reduction effects at higher levels of the input video signal. Since most noise components contained in an input video signal are in the high frequency region, it is particularly necessary to emphasize the degree of noise reduction in higher frequency regions rather than in lower frequency regions. According to this invention, as shown in FIG. 1, the interframe difference signal from subtracter 8 has its high frequency component eliminated by chroma noise equalizer 9 before it is supplied to motion detector 10. Thus, the noise reduction effect is emphasized only in high frequency regions to minimize noise-induced interference such as cross talk and cross color in the chrominance component. Alternatively noise reduction, or improvement of the S/N ratio, is not emphasized for video signals in low frequency regions and therefore no additional undesired effects such as lag are produced.

Figure 3:
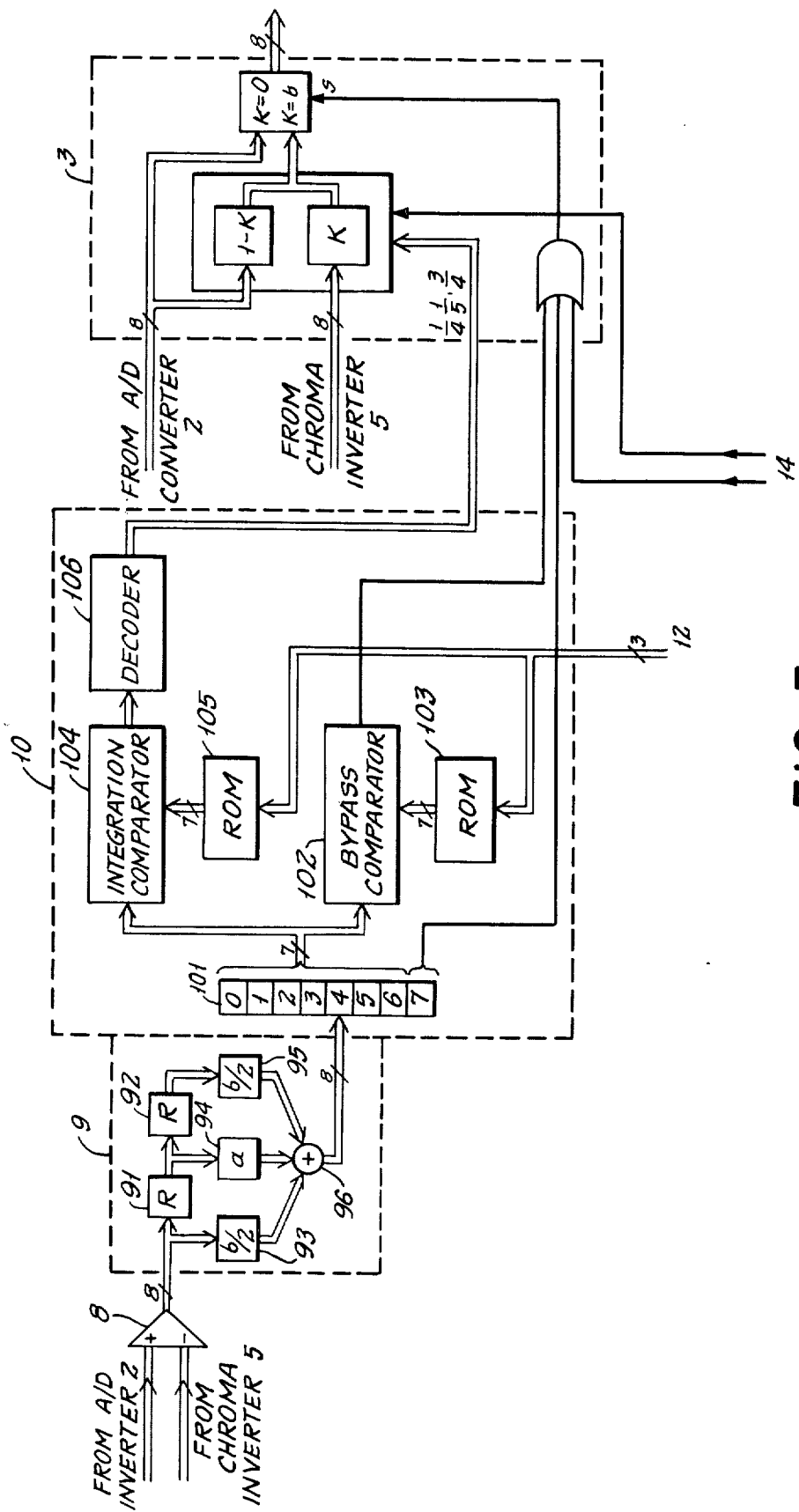
FIG. 3 is a block diagram showing details of one portion of the embodiment shown in FIG. 1.

Chroma noise equalizer 9, shown in part of the circuit configuration of FIG. 3, is comprised of registers 91 and 92, coefficient attenuators 93, 94 and 95 and an adder 96. Assuming that the coefficient attenuators 93 and 95 have a coefficient of b/2, and the coefficient attenuator 94 has a coefficient of a, the characteristics of the chroma noise equalizer 9 will vary according to the value of a and b. FIG. 4 is a graph showing one example of the characteristics of the chroma noise equalizer 9. In FIG. 4, a is $$\frac{1 + \sqrt{2}}{3}$$

and b is $$\frac{2 - \sqrt{2}}{3}$$

for the curve $\omega_1$; a is $\frac{2}{3}$ and b is $\frac{1}{3}$ for the curve $\omega_2$; and a is 5/9 and b is 4/9 for the curve $\omega_3$. The emphasis of the noise reduction at the high frequency region is more pronounced in the curve $\omega_3$.

As discussed hereinabove, another requirement with a reliable noise reduction system is that the degree of improvement of the S/N ratio must be controlled by the level of noise contained in the input video signal. To this end, input video signal from the input terminal 1 (FIG. 1 referred to) is supplied to a noise level detector 14 which detects the noise level and supplies the reference signal to decoder 13 in response to said noise level. The reference signal supplied from the noise level detector 14 may be directly supplied to the input level dependent equalizer 12 as the predetermined reference signal. However, since a linear relationship between the noise level and the degree of noise reduction does not necessarily provide a reproduced picture of best visual quality on the screen, a variable relationship between the noise level and the extent of improvement of S/N the ratio is intentionally introduced through decoder 13.

Figure 5:
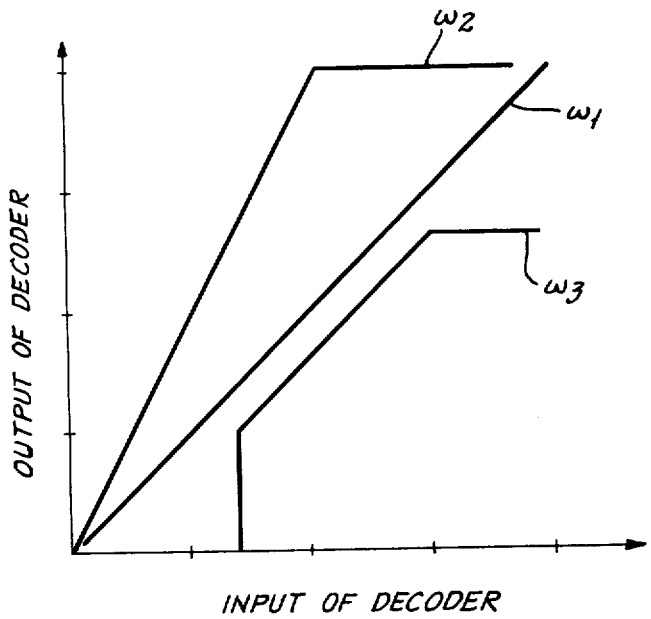
FIG. 5 show characteristic curves of a decoder included in the embodiment shown in FIG. 1.

FIG. 5 illustrates an example of the characteristics of decoder 13 wherein curve $\omega_1$ represents direct supply of the output of the noise level detector 14 to the input level dependent equalizer 12 curve $\omega_2$ represents emphasized noise reduction and curve $\omega_3$ represents the case where no improvement is made in the S/N ratio when the noise level is low and the degree of noise reduction is made constant when the noise level reaches a predetermined level.

Referring to FIG. 1, the noise level detector 14 delivers a control signal to the variable adder circuit 3, said control signal being such that it reduces the factor k to zero when the noise level is low. The principle and construction of the noise level detector 14 will be described hereinafter in detail.

FIG. 3 is a detailed block diagram of the portion of FIG. 1 which comprises subtracter 8, chroma noise equalizer 9, motion detector 10 and variable adder circuit 3. In the motion detector 10, the inter-frame difference signal from the chroma noise equalizer 9 is supplied to a register 101. The inter-frame difference signal is an 8-bit binary signal. The most significant bit (MSB) of the output from the register 101 is used as a control signal which reduces the coefficient k, for the attenuator in the variable adder circuit 3, to zero. The seven less significant bits are supplied to a bypass comparator 102 and integration comparator 104. Bypass comparator 102 compares the output from register 101 with the 7-bit reference signal from ROM 103. Upon detecting that the output from register 101 is larger than the reference signal; coefficient k, for the attenuator in the variable adder circuit 3 is reduced to zero. Integration comparator 104 compares the output from register 101 with another 7-bit reference signal from ROM 105 and applies the result of the comparison to decoder 106. This decoder is of the same construction as disclosed in U.S. Pat. No. 4,064,350 and changes the coefficient for the attenuator in variable adder circuit 3 in response to the comparison in comparator 104. According to this invention, the reference signals from ROM's 103 and 105 can be changed by up to 8 steps depending upon the output from the input level dependent equalizer (ROM) 12. In other words, the reference signals are controlled in the manner represented by the characteristic curve in FIG. 2. It is to be understood that the reference supplied from ROM 103 is maintained at a higher level than the reference from ROM 105. The variable adder circuit 3 is of the same circuit configuration as shown in U.S. Pat. No. 4,064,350.

Noise level detector 14 in FIG. 1 will now be described referring to FIG. 6 and other drawings. The noise level detection according to this invention is based on the inter-frame and line-to-line correlation of television video signals. FIGS. 6 (a) and (b) show video signals of a single horizontal scanning time delayed from one another by a single frame or line period, and FIG. 6 (c) shows a signal representing the difference between the two video signals. The signals in FIGS. 6 (a) and (b) are so closely correlated to each other that the resultant differential signal contains no signal component and contains only the noise component. Since no frame or line correlation exists in the noise compartment contained in a television video signal, the average power of the noise is determined by the average of the square of the differential signal.

FIG. 7 shows television video signals having a low inter-frame or line-to-line correlation. The frame-to-frame or line-to-line correlation for the signals shown in FIGS. 7 (a) and (b) is so low that the difference signal shown in 7 (c) contains a component corresponding to a change in the video signal. This means that the part of the differential signal defined by $t_1$ and $t_2$ contains a component other than the noise component and that therefore such a differential signal cannot be used to represent the noise component. The instant invention takes advantage of the fact that video signal components have high proximity correlation and that the change in level of the video signal component is higher than that in level of a change noise component. In addition the instant invention does not use that part of the differential signal defined by $t_1$ and $t_2$ for the purpose of the noise level detection.

Figure 8:
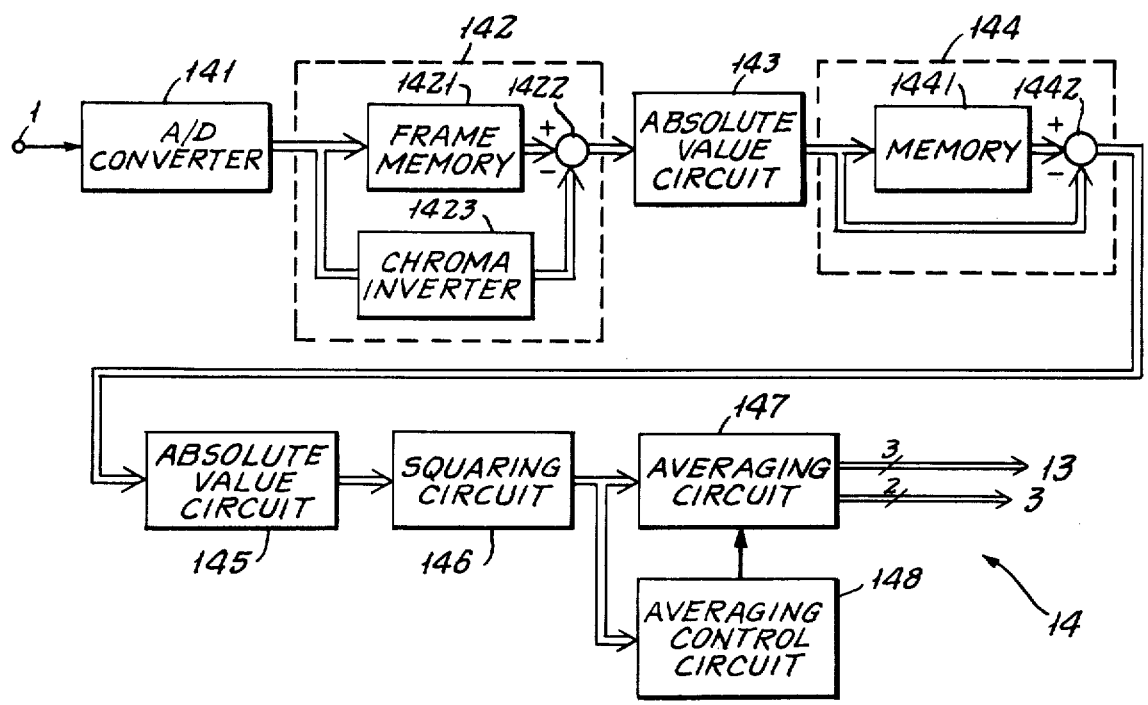
FIG. 8 is a block diagram of a noise level detector circuit according to this invention.

FIG. 8 is a block diagram of the noise level detector 14 shown in FIG. 1. In FIG. 8, the input video signal from the input terminal 1 is converted by A/D converter 141 to a PCM signal. The output from the A/D converter 141 is supplied to a video component separator circuit 142 for eliminating the video component by using frame correlation. The video component separator circuit 142 is comprised of a frame memory 1421, a subtractor 1422 and a chroma inverter 1423. The separator circuit output represents output the difference between the signal of the present frame and the signal of the immediate prior frame. The transmission characteristics $F_f(T)$ of the video component separator circuit 142 are expressed by the relationship:

$$F_f(T) = 1 - e^{-j\omega T} \text{ (T = 1 frame period)}$$

Figure 9:
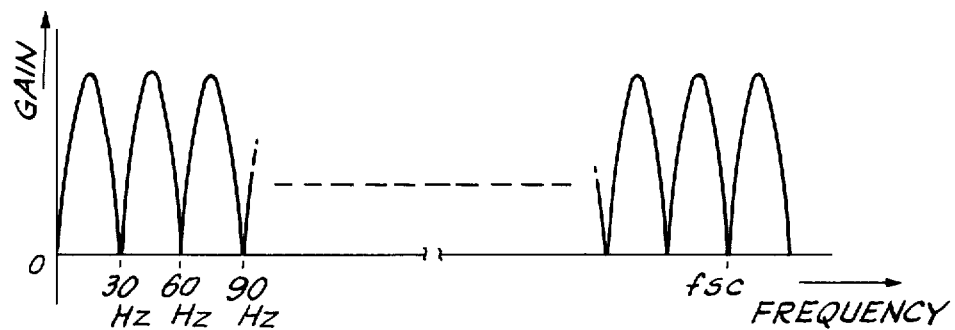
FIG. 9 shows characteristic curves of a noise component filter circuit based on frame-to-frame correlation.

As shown in FIG. 9, which illustrates the gain characteristics of the separator circuit 142, the video component separator circuit 142 does not deliver d.c. components or integral multiples of the 30 Hz component of the video signal but it delivers a noise component and a component corresponding to a change in the video signal occuring between frames. The output from the video component separator circuit 142 is suppled to an absolute value circuit 143 which produces an output in terms of absolute values.

The output of the absolute value circuit 143 is supplied to a video component separator circuit 144 for performing additional removal of the video component using line-to-line correlation. The video component separator circuit 144 is comprised of a memory 1441, representing a period 227 times as large as the subcarrier period and a subtracter 1442. The transmission characteristics $F_1(t)$ of the video component separator circuit 144 is expressed by the relationship:

$$F_1(t) = 1 - e^{-227j\omega t} \text{ (t = 1 subcarrier period)}$$

Figure 10:
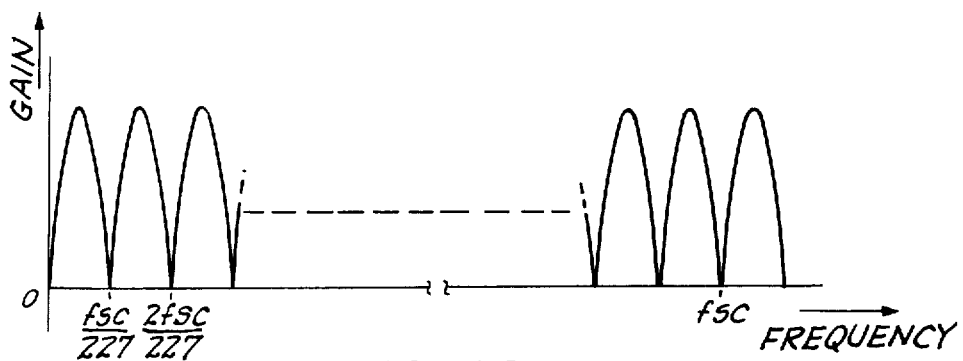
FIG. 10 shows characteristic curves of a noise component filter circuit based on line-to-line correlation.

As shown in FIG. 10, which illustrates the gain characteristics of the separator circuit 144, only a single separator circuit is required to eliminate portions of high line-to-line correlation of both the luminance and chrominance components of the interlaced NTSC video signals. The video component separator circuit 144 outputs the noise component plus signal component of low line-to-line correlation, which output is then supplied through an absolute value circuit 145 to a squaring circuit 146 to produce a squared value. The output of the squaring circuit 146 is averaged by an averaging circuit 147 to be delivered as a detected noise level.

Figure 11:
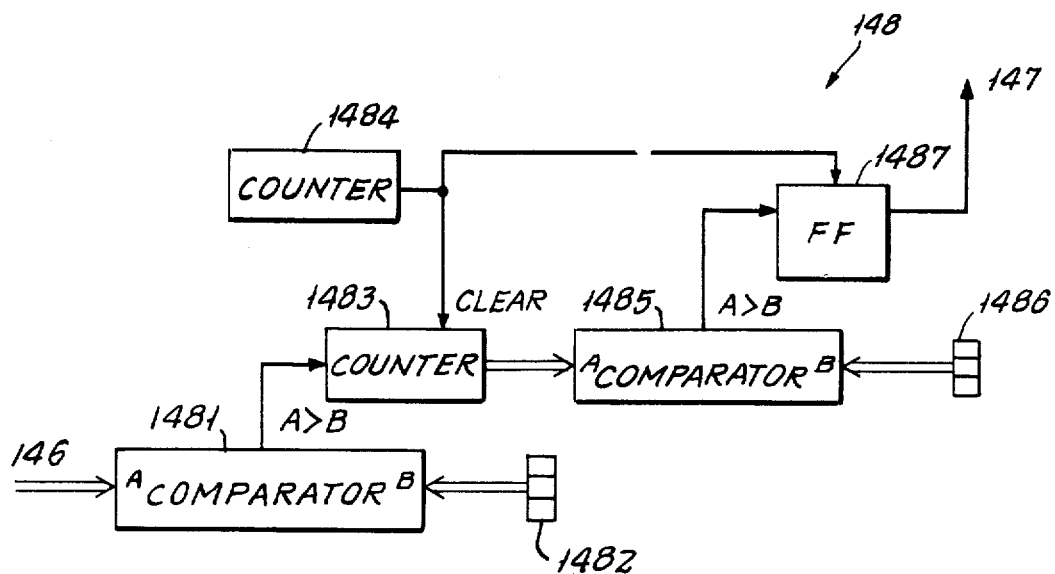
FIG. 11 shows a block diagram of the averaging control signal generator circuit included in the circuit of FIG. 8.

Since television video signals have relatively high inter-frame and line-to-line correlation it may safely be concluded that the output from squaring circuit 146 is substatially comprised of the noise component. However, if the degree of noise reduction is to be changed according to the noise level, it is necessary that the noise level be detected with extreme accuracy. Therefore, in FIG. 8, an averaging control circuit 148 is used to control the operation of the averaging circuit 147. FIG. 11 is a block diagram of the averaging control circuit 148 wherein a comparator 1481 receives the output from the squaring circuit 146 and compares the same with a threshold value 1482 at every sampling point. If the absolute value circuit 145 delivers an output which is larger than the threshold value 1482, a counter 1483 counts the number of sampling points. A counter 1484 counts, for example, 256 sampling points and outputs a clear pulse at each 256 sampling point cycle. Since counter 1483 is reset to zero in response to the clear pulse, the output of counter 1483 is the number of sampling points that exceed the threshold value 1482 during the 256 sampling point cycle. The averaging control circuit 148 does not recognize the output of squaring circuit 146 as a noise component if the number of sampling points that exceeds the threshold value 1482 per line is more than a predetermined level. It is understood that the number of sampling points counted by counter 1484 may be close to the number of sampling points equivalent to one line. The output from counter 1483 is supplied to comparator 1485 to be compared with a threshold value 1486, which is less than 10 in the embodiment described herein. When the output of counter 1483 exceeds the threshold value 1486 in the comparator 1485, a clear pulse from counter 1484 causes a flip-flop 1487 to be set until the next clear pulse is received. The set output of flip-flop 1487 is utilized as a control signal for terminating the operation of averaging circuit 147.

FIG. 12 is a timing diagram for illustrating the operation of the averaging control circuit shown in FIG. 11. In FIG. 12, line (a) represents the output of squaring circuit 146, line (b) represents a clear pulse from counter 1484 line, (c) represents the output of comparator 1485 when the output of counter 1483 exceeds the threshold value 1486, and line (d) represents the output of flip-flop 1487. Referring to FIG. 12 ($d$), an input signal to averaging circuit 147 is not used for averaging purposes during the periods $T_1$ and $T_2$. Thus, that portion of the differential signal defined by $t_1$ and $t_2$ in FIG. 7 ($c$) will never be used for the purpose of detecting the noise level. Referring to FIG. 12 ($d$), the periods $T_1$ and $T_2$ are delayed from the output of FIG. 12 ($c$) by one clear pulse cycle, but this delay is not disadvantageous because the proximity correlation of the television video signal is extremely high.

Figure 13:
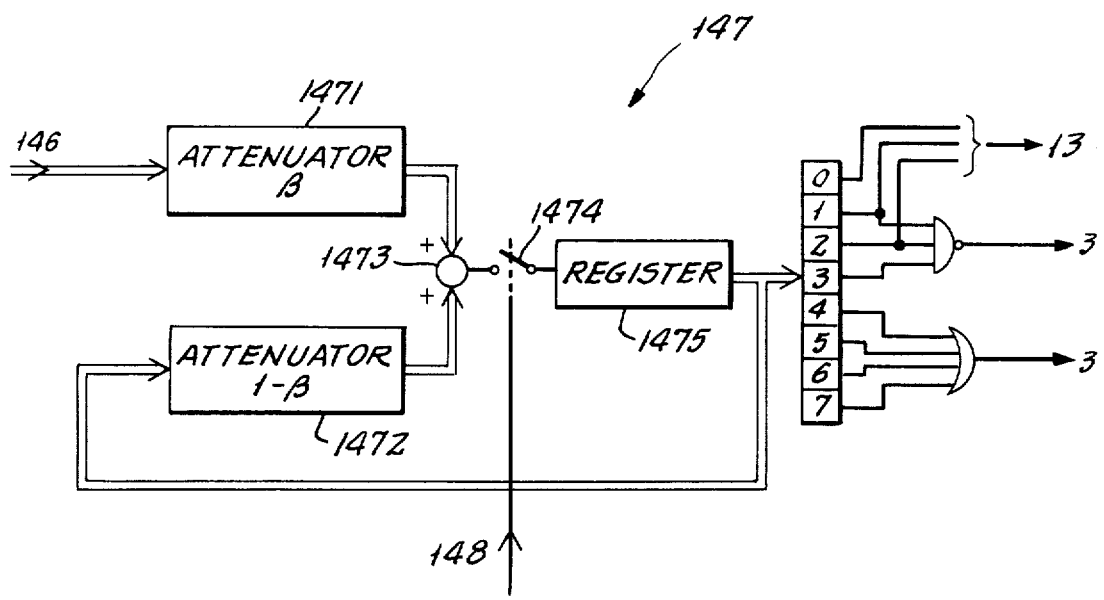
FIG. 13 is a block diagram of the averaging circuit shown in FIG. 8.
Figure 12A:
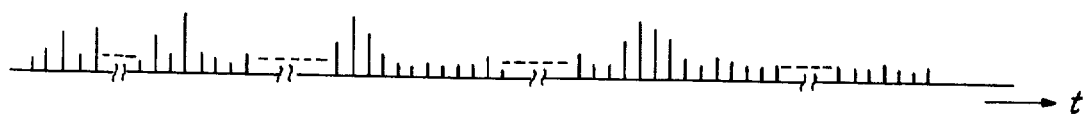
FIGS. 12a–d are timing diagrams for illustrating the operation of the averaging control signal generator circuit shown in FIG. 11.
Figure 12B:
Figure 12C:
Figure 12D:

FIG. 13 is a block diagram of averaging circuit 147 shown in FIG. 8, which is comprised of attenuators 1471, 1472, adder 1473, switch 1474 and a register 1475. The operating theory of averaging circuit 147 is the same as when it is incorporated in the circuit of the FIG. 1 for improvement of S/N ratio. Assuming that the attenuators 1471 and 1472 have coefficients $\beta$ and 1-$\beta$, respectively, the value of $\beta$ is selected at $\frac{1}{2}^{20}$ for the purpose of the embodiment described herein. The switch 1474 is controlled by the output from the averaging control circuit 148. In other words, switch 1474 is off during the periods $T_1$ and $T_2$ in FIG. 12 ($d$). The output of the averaging circuit 147 is supplied to decoder 13 of FIG. 1 as a signal indicating the noise level. Although averaging circuit 147 performs arithmetic operations in terms of 8-bit signals, only the three least significant bits, for example, need be used as the noise level output. This is possible because it can safely be concluded that the noise level is much lower than the level of the video signal. In the embodiment described herein, if all of the two to four least significant bits of the eight bits constituting the output of the averaging circuit 147 are zero, and the noise level is assumed to be extremely low, then the noise reduction system of FIG. 1 ceases operation by reduction of the coefficient k, for the attenuators 31 and 33 of the variable adder circuit 3 of FIG. 1, to zero. Alternatively, the coefficient k is maintained at a maximum value if the two to four least significant bits have over-flowed.

Figure 14:
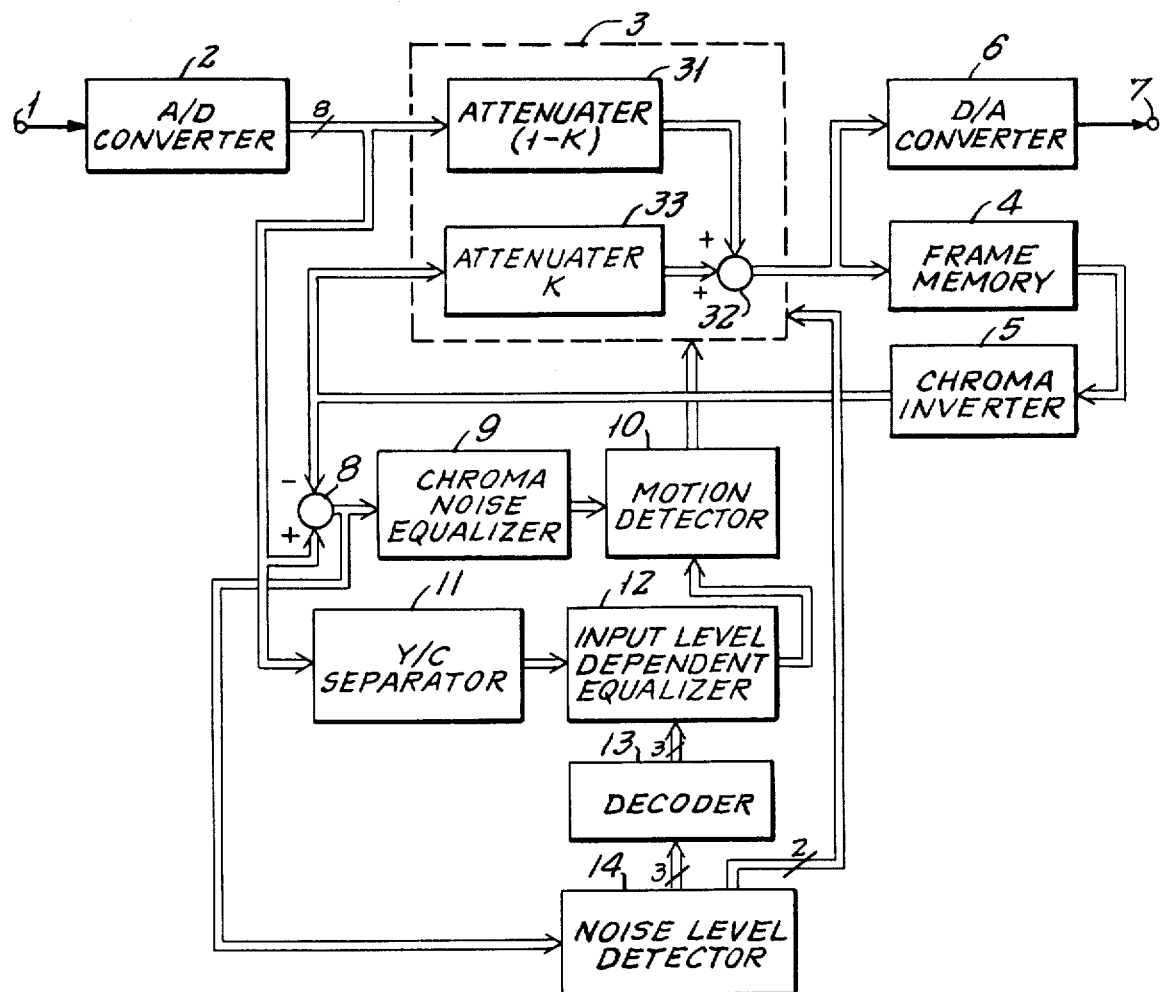
FIG. 14 is a block diagram of another embodiment of this invention.

FIG. 14 is a block diagram of the noise reduction system according to another embodiment of this invention. It differs from the system shown in FIG. 1 in that it uses the output of the subtracter 8 (FIG. 1) as an input signal to a noise level detector 14'. The reason for such a circuit configuration is that the output from the video component separator circuit 142, in the noise level detector 14 of FIG. 8, has the same content as the output from subtracter 8. The circuit configuration of FIG. 14 has the advantage of using fewer hardware devices.

Figure 15:
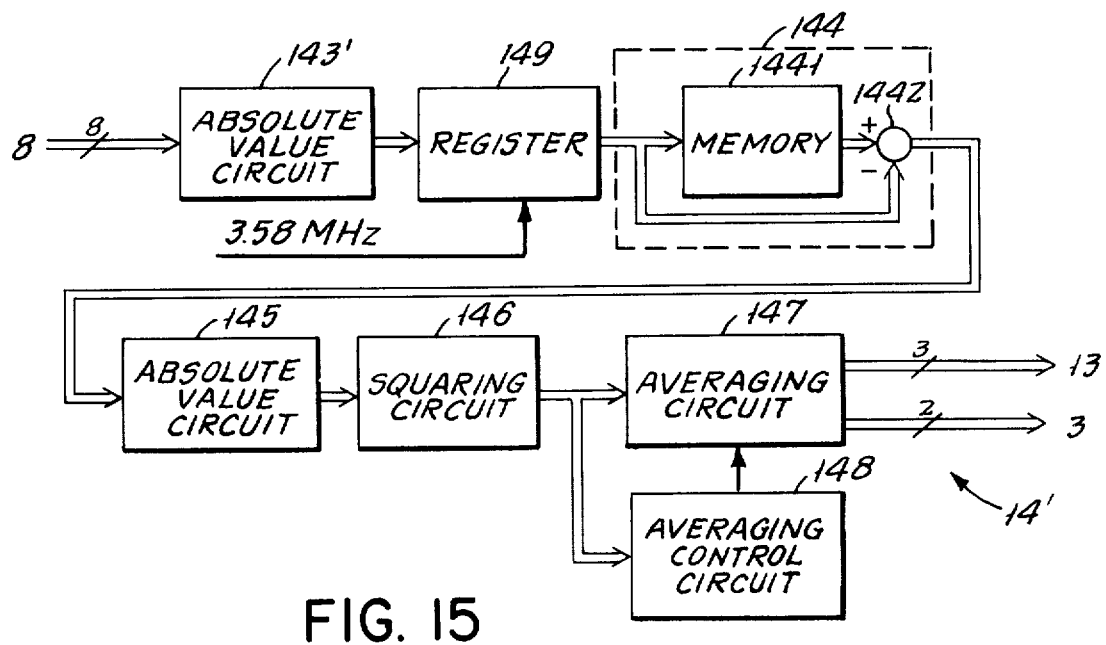
FIG. 15 is a block diagram of a noise level detector circuit employed in the embodiment shown in FIG. 14.

FIG. 15 is a block diagram of the noise level detector 14' of FIG. 14. In FIG. 15, the output of subtracter 8 is supplied to a register 149 through an absolute value circuit 143'. The register 149, to which a clock signal of 3.58 MHz is supplied, converts the sampling frequency of the output from subtracter 8 (which is at 10.74 MHz, for instance) to 3.58 MHz. The reason for this is that noise level detection may be performed at the color subcarrier frequency 3.58 MHz rather than at the sampling frequency 10.74 MHz, because the noise reduction effect itself is not necessary for digital transmission of a video signal. The sampling frequency of 10.74 MHz may be used for the signal processing stream of the absolute value circuit 143', but this requires additional hardware devices when compared with the circuit configuration of FIG. 8. It is also understood that the output from an absolute value circuit 145 may be used as an input to the averaging control circuit 148 in FIGS. 8 and 15.

Although a specific embodiment of this invention has been shown and described it will be understood that various modifications may be made without departing from the spirit of this invention.

We claim:

1. A noise reduction system for reducing noise contained in an incoming television video signal, said system comprising, summing means having first and second input terminals for adding first and second signals respectively applied thereto to produce a sum signal;
means for coupling a first controllable fractional amplitude portion of the arriving video signal to the first input terminal of said summing means;
delay means, connected to receive said sum signal from said summing means, for delaying said sum signal for a period substantially equal to the period of one television frame; coupling means, including means for coupling a second controllable fractional amplitude portion of the delayed signal from said delay means to the second input terminal of said summing means; means for producing a differential signal representing the difference between the incoming video signal and the delayed video signal; comparator means for comparing said differential signal with a reference signal;

first control means for controlling said reference signal in response to said incoming video signal; and second control means for controlling said first fractional amplitude portion and said second fractional amplitude portion in response to the output of said comparator means, the sum of said first and second fractional amplitude portions being a constant; whereby said summing means combines a fractional amplitude portion of each incoming television frame with a fractional amplitude portion of the sum of portions of preceding delayed frames to obtain an averaged noise-reduced video signal of an amplitude equivalent to that of the incoming video signal.

2. A noise-reduction system for reducing noise contained in an incoming television video signal, said system comprising;

summing means having first and second input terminals for adding first and second signals respectively applied thereto to produce a sum signal;

means for coupling a first controllable fractional amplitude portion of the incoming video signal to the first input terminal of said summing means; delay means, connected to receive said sum signal from said summing means, for delaying said sum signal for a period substantially equal to the period of one television frame;

coupling means, including means for coupling a second controllable fractional amplitude portion of the delayed signal from said delay means to the second input terminal of said summing means; means for producing a difference signal representing the difference between the incoming video signal and the delayed video signal;

equalizing means for attenuating the high frequency component of said differential signal;

comparator means for comparing the output from said equalizing means with a reference signal; and control means for controlling said first fractional amplitude portion and said second fractional amplitude portion in response to the output of said comparator means, the sum of said first and second fractional amplitude portions being a constant;

whereby said summing means combines a fractional amplitude portion of each incoming television frame with a fractional amplitude portion of the sum of portions of preceding delayed frames to obtain an averaged noise-reduced video signal of an amplitude equivalent to that of the arriving video signal.

3. A noise reduction system for reducing noise contained in an incoming television video signal, said system comprising; summing means having first and second input terminals for adding first and second signals respectively applied thereto to produce a sum signal; means for coupling a first controllable fractional amplitude portion of the incoming video signal to the first input terminal of said summing means;

delay means, connected to receive a sum signal from said summing means, for delaying said sum signal for a period substantially equal to the period of one television frame;

coupling means, including means for coupling a second controllable fractional amplitude portion of the delayed signal from said delay means to the second input terminal of said summing means;

means for producing a differential signal representing the difference between the incoming video signal and the delayed signal;

comparator means for comparing said differential signal with a reference signal;

detecting means for detecting the noise level contained in the incoming signal;

first control means for controlling said reference signal in response to the output of said detecting means; and second control means for controlling said first fractional amplitude portion and said second fractional amplitude portion in response to the output of said comparator means, the sum of said first and second fractional amplitude portions being a constant; whereby said summing means combines a fractional amplitude portion of each arriving television frame with a fractional amplitude portion of the sum of portions of preceding delayed frames to obtain an averaged noise-reduced video signal of an amplitude equivalent to that of the arriving video signal.

4. A noise reduction system for reducing noise contained in an incoming television video signal, said system comprising;

a memory for storing a first frame portion of said incoming video signal;

means for adding said first stored frame portion to a second frame portion immediately subsequent in time to said first stored frame portion;

means for determining a signal level difference between said first frame portion and said second frame portion; first control means responsive to said signal level difference for controlling said adding means;

means for detecting the level of said incoming signal; and means responsive to the output of said detecting means for controlling said first control means.

5. A noise reduction system in accordance with claim 4 wherein there is further included means for attenuating a high frequency component of said signal level difference, means for comparing an output of said equalizing means with a reference signal and means responsive to said comparing means for controlling the signal amplitude of said first and second frame portions.

6. A noise reduction system in accordance with claim 4, wherein there is further included means for detecting the noise level contained in said incoming signal and second control means responsive to said detected noise level for controlling said first control means.

* * * * *